(12) United States Patent
Chelko

(10) Patent No.: US 6,554,528 B2
(45) Date of Patent: Apr. 29, 2003

(54) UTILITY BRACKET

(76) Inventor: Thomas Chelko, 1448 Rivermist Dr., Lilburn, GA (US) 30047

( * ) Notice: Subject to any disclaimer, the term of this patent is extended or adjusted under 35 U.S.C. 154(b) by 0 days.

(21) Appl. No.: 09/854,805

(22) Filed: May 14, 2001

(65) Prior Publication Data

US 2002/0043028 A1 Apr. 18, 2002

Related U.S. Application Data

(60) Provisional application No. 60/204,315, filed on May 15, 2000.

(51) Int. Cl.[7] ................................................. B25G 3/02
(52) U.S. Cl. .................. 403/364; 52/285.1; 211/90.01; 108/157.18; 108/158.12
(58) Field of Search .......................... 52/285.1–285.3, 52/698; 403/364, 375, 380, 381; 108/60, 50.02, 157.18, 158.12; 312/196, 223.3; 248/214, 220.1, 247, 235; 211/50.01

(56) References Cited

U.S. PATENT DOCUMENTS

| | | | | |
|---|---|---|---|---|
| 757,812 A | * | 4/1904 | Keyes ........................ 403/364 |
| 1,286,588 A | * | 12/1918 | Goodykoontz ............... 108/28 |
| 1,663,968 A | * | 3/1928 | Beckanstin ................. 403/381 |
| 2,096,024 A | * | 10/1937 | Anderson .................... 108/30 |
| 2,368,285 A | * | 1/1945 | Bullard ....................... 312/238 |
| 2,522,442 A | * | 9/1950 | Garris ......................... 108/42 |
| 3,591,212 A | * | 7/1971 | Rhyne ......................... 217/65 |
| 3,853,294 A | * | 12/1974 | Albinson et al. ............ 211/134 |
| 4,026,220 A | * | 5/1977 | Schuring, Jr. ................ 108/101 |
| 4,708,310 A | | 11/1987 | Smith ........................ 248/220.1 |
| 5,065,832 A | * | 11/1991 | Mark ........................ 108/50.02 |
| 5,267,715 A | * | 12/1993 | Owen ......................... 248/235 |
| 5,312,078 A | * | 5/1994 | Marsh ....................... 248/220.1 |
| 5,513,575 A | | 5/1996 | Slade ........................... 108/42 |
| 5,588,370 A | | 12/1996 | Longley ....................... 108/42 |
| 5,660,120 A | * | 8/1997 | Sims ........................ 108/50.02 |
| 5,724,894 A | | 3/1998 | Knorovsky .................... 108/42 |
| 5,797,440 A | * | 8/1998 | Tsai .......................... 160/135 |
| 5,893,617 A | * | 4/1999 | Lee .......................... 108/158.13 |
| 5,983,805 A | | 11/1999 | Waluda ........................ 108/42 |
| 5,992,654 A | | 11/1999 | Dente, Jr. ................ 211/90.01 |
| 6,349,507 B1 | * | 2/2002 | Muellerleile ................ 108/106 |

* cited by examiner

*Primary Examiner*—Lynne H. Browne
*Assistant Examiner*—James M. Hewitt
(74) *Attorney, Agent, or Firm*—Thomas, Kayden, Horstemeyer & Risley, LLP

(57) ABSTRACT

A utility bracket designed for use in modular office arrangements wherein planar walls are used to form office cubicles is substantially planar and has a configuration, such as triangular, to fit within a corner formed by intersecting walls. Two of the legs of the triangle, for example, each has an array of a plurality of spaced U-shaped support member which fit down over the top of the walls to support the bracket in the cubicle corner. The support members are offset relative to each other along the lengths of the corresponding legs so that when two or more brackets are used to fill corners at, for example, a four corner intersection, the support members of two adjacent brackets interdigitate.

19 Claims, 3 Drawing Sheets

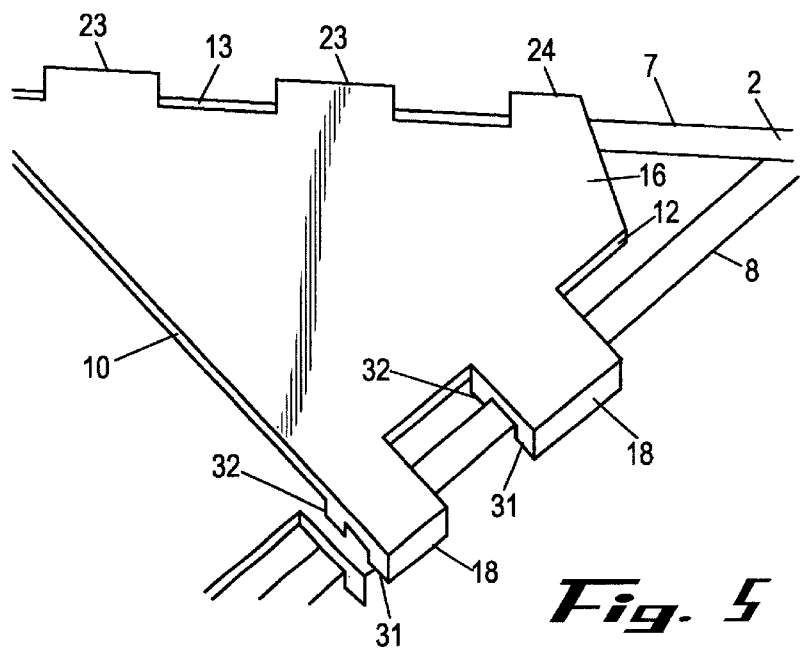
Fig. 5
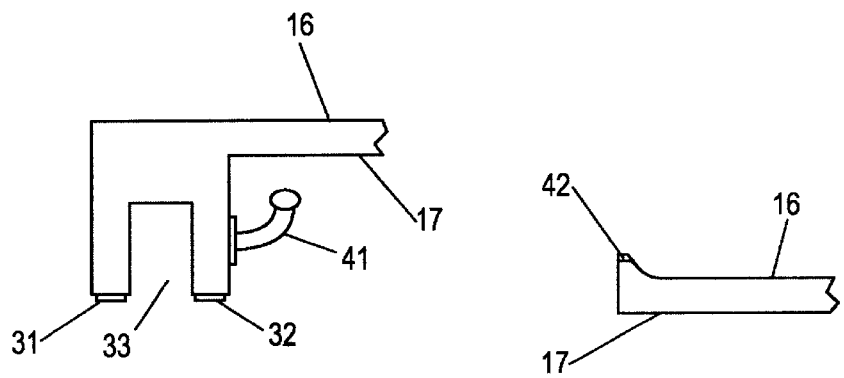
Fig. 6          Fig. 7
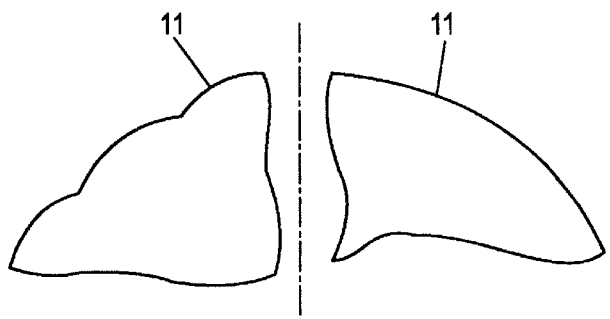
Fig. 9          Fig. 8

UTILITY BRACKET

RELATED APPLICATIONS AND CLAIM OF PRIORITY

This application is a utility patent application, inventive features of which are shown in U.S. Provisional Patent Application Serial No. 60/204,315, filed May 15, 2000, of which priority is claimed herein.

FIELD OF THE INVENTION

This invention relates to a utility bracket for use in modular offices or work stations. More particularly, it relates to such a bracket for utilitarian or decorative purposes, or both, that can be removably located within an office cubicle, for example.

BACKGROUND OF THE INVENTION

The continuing quest for efficient use of space in an office milieu has led to various forms of modular offices or work spaces for creating several such within a given space. In general, such modular offices are formed as cubicles by attaching together pre-fabricated wall portions, generally at right angles to each other. The wall portions are usually five to seven feet in height, and special clips are used to join the walls together. Such an arrangement of cubicles represents an efficient use of space, although the general tendency is to make each cubicle just large enough to contain a bare minimum of furniture or appliances. Further, uniformity dictates that the pre-fabricated walls be a neutral color, with the net result that each cubicle is composed of three or four drab walls. Shelves and the like may be installed in place by special clips which attach to the metal frames of the walls, but little or no provision is made for hanging pictures, supporting flower pots, or other measures for relieving the drabness without compromising available space. Although the shelves can support such things as flower pots, usually the shelf dictates where the flower pot or other decorative device is to be located and often is of insufficient supporting strength. Further, such floor space occupying items such as, for example, a clothes tree, only serve to crowd the cubicle more and contribute to an almost claustrophobic effect.

SUMMARY OF THE INVENTION

The present invention is directed to an efficient use of space, particularly in a modular type of office arrangement wherein pre-fabricated wall members are used to create a plurality of individual cubicles. The invention is a bracket member of a suitable sturdy moldable material such as any of a number of plastics, although other suitable materials may be used, which fits down over the corner formed by the junction of two wall members. The bracket, which, for example and preferably, is triangular in shape, is substantially planar and has a top surface, a bottom surface, and first and second rear surfaces which are preferably normal to each other and form the legs of a right triangle, of which a front leg or edge is the hypotenuse. In accordance with the invention, each of the rear legs has a number of spaced U-shaped support fingers or support brackets extending downwardly from the bottom surface of the planar bracket. The two legs of the U-shape are spaced apart a distance that is slightly greater than the width of the module wall, so that the bracket of the invention fits snugly on, and is supported by, the intersecting walls.

A feature of the present invention is that the array of spaced U-shaped fingers on one of the rear legs of the utility bracket is different from the array of fingers on the other rear leg. As will be explained fully hereinafter, the arrays differ primarily in the positioning of the U-shaped fingers and the spaces therebetween. As will be apparent from the following, when two or more utility brackets are used with, for example, four cubicles formed by intersecting walls, the fingers of each interdigitate with the fingers of adjoining utility brackets so that at the wall intersection, where four cubicle corners are formed, four utility brackets, one for each cubicle, can be used and are equally supported. As will be more clearly seen hereinafter, the utility brackets are identical to each other in their basic configuration, thereby requiring the one mold for the molding thereof, where the brackets are of suitable plastic material, of only one bracket configuration. Thus, it is not necessary that a plurality of different bracket configurations be produced. It is, however, possible, as will be seen from the following, to accessorize individual brackets for special uses and, to that extent, differently configured brackets may be produced.

The principles and features of the present invention will be more readily apparent from the following detailed description, read in conjunction with the accompanying drawings.

DESCRIPTION OF THE DRAWINGS

FIG. 5 is a partially perspective, partially cross-section view illustrating the mounting of the utility bracket of the invention at a cubicle corner;

FIG. 6 is a partial view of one accessory arrangement for the bracket of the invention;

FIG. 7 is a partial view of a modification of the top surface of the bracket of the invention;

FIG. 8 is a partial view of a modified front edge of the bracket of the invention; and FIG. 9 is a partial view of a different modification of the front edge of the bracket of the invention.

DETAILED DESCRIPTION

Figure 1:
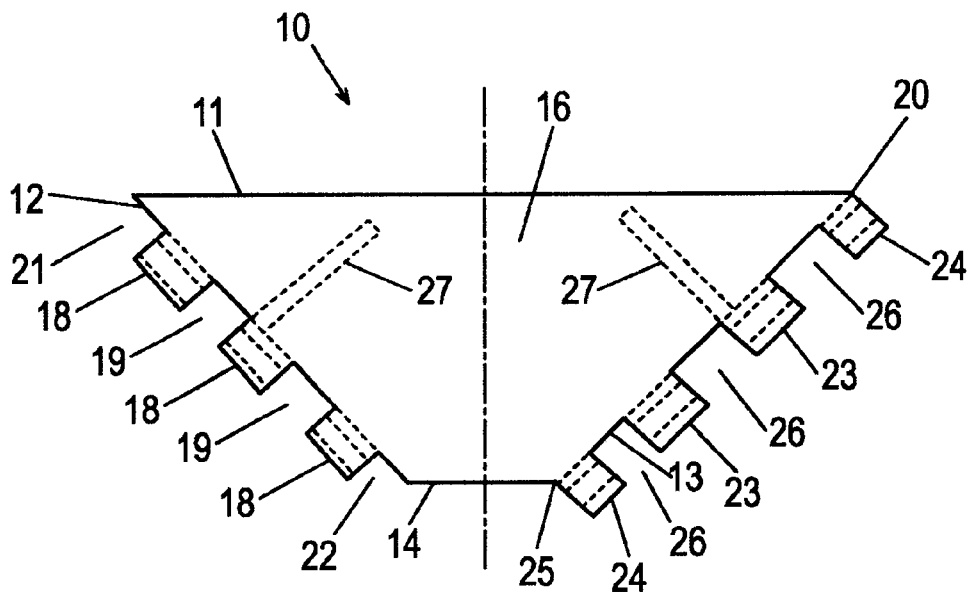
FIG. 1 is a plan view of the utility bracket of the invention.
Figure 2:
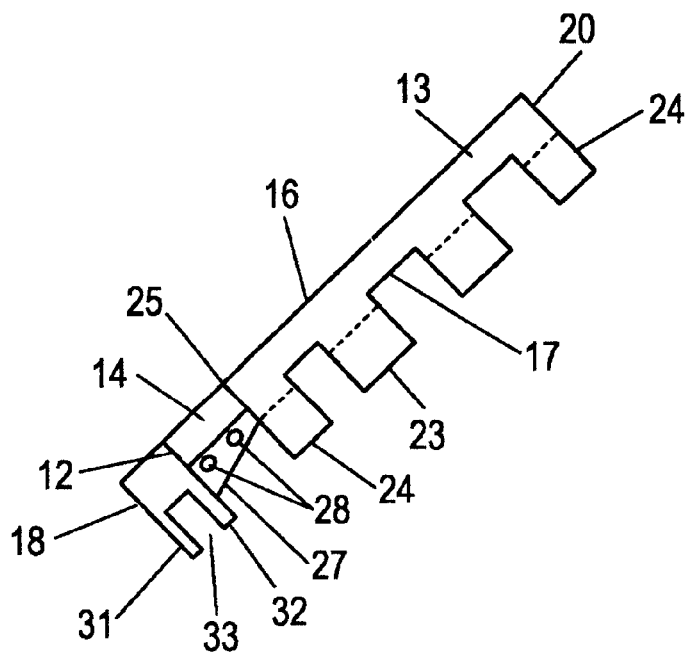
FIG. 2 is an elevation view of one of the rear legs of the triangular bracket of FIG. 1.

The utility bracket 10 of the present invention is shown in plan and side elevation views in FIG. 1 and FIG. 2 respectively. As can be seen, the bracket 10 is basically shaped as a right triangle having a front leg or hypotenuse 11, and first and second rear legs 12 and 13. Bracket 10 is preferably made, as by molding, of a plastic material such as PVC, although it is to be understood that other materials such as wood, metal, or other plastics, including Styrofoam may be used, provided the material has sufficient rigidity and strength to bear moderately heavy loads. As can be seen in FIG. 1, the right triangle shape has a truncated portion 14 and top and bottom surfaces 16 and 17 respectively. Along leg 12 and extending downwardly from the bottom surface 17 are a plurality of spaced U-shaped fingers or support brackets 18, preferably of equal width, with the spaces 19 therebetween being of the same width as the fingers 18. The array of fingers 18 is indented at the junction of leg 12 with the front leg 11, the indentation 21 being substantially equal to one-half the width of a finger 18. In a similar manner, an indentation 22 spaces the end fingers 18 from the truncated portion 14. Indentation 22 also has a width of approximately one-half the width of the end finger 18. The width dimensions of indentations 21 and 22 may be less or more than as stated, however, for simplicity in forming, the dimensions given are adequate, as will be apparent hereinafter. Along rear leg 13 is a second array of spaced U-shaped fingers 23 and 24, the width of the spaces 26 between the fingers being equal to the width of the fingers 23 and the fingers 18. One of the end fingers 24 begins at the junction 20 with leg 11, and extends for a distance along leg 13 equal to one-half the width of fingers 23. In like manner, the other end finger 24 begins at the intersection 25 of leg 13 with truncated portion 14 and extends along leg 13 for a distance equal to one-half the width of the fingers 23.

FIGS. 1 and 2 also show bracing members 27 which extend along the bottom surface 17 to add strength to the bracket 10. Member 27 may be made of any suitable strength material, and may be glued in place. Inasmuch as members 27 are exposed to the eye, it is to be preferred that they not be offensive thereto, hence, the material chosen should not be unattractive. For additional utility of the overall assembly, holes 28 may be drilled through members 27 to permit hanging of coat-hangers, for example.

As best seen in FIG. 2, each of the U-shaped fingers or support brackets 18, 23, and 24 has first and second spaced legs 31 and 32, with the space 33 therebetween being approximately the width of one of the cubicle walls. It is possible to eliminate leg 32 provided leg 31 is made long enough to provide the necessary support for bracket 10. It is also possible that front legs 32 and rear legs 31 be alternated.

Figure 3:
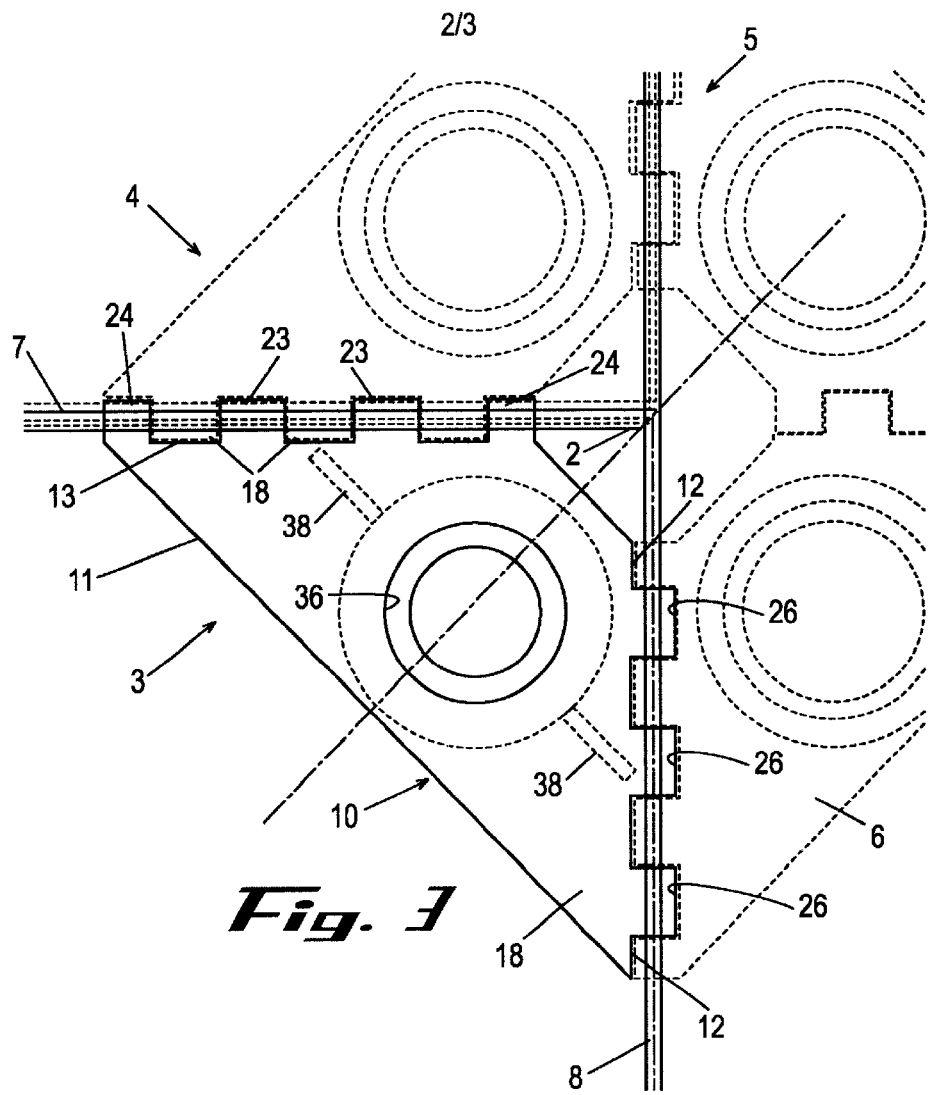
FIG. 3 is a plan view of the bracket of the invention, shown in solid lines, as used with three other brackets at a four corner cubicle wall intersection.

FIG. 3 is a plan view of the bracket 10 of the invention, shown in solid lines and three other virtually identical brackets shown in dashed lines, illustrating the configuration for a four cubicle assembly, cubicles 3, 4, 5, and 6 with a single, common intersection 2 of walls 7 and 8. It can be seen in FIG. 3 that rear leg 12 of bracket 10 in the corner of cubicle 3 is opposite leg 13 of the bracket in the corner of cubicle 6 and rear leg 13 is opposite leg 12 of the bracket in the corner of cubicle 4. It will always be the case that a rear leg having the array of fingers 18 will be opposite the other rear leg having the array of fingers 23 and, as a consequence, the fingers interdigitate when position on the cubicle wall 7 or 8. Thus, fingers 18 will locate in spaces 26, and fingers 23 and 24 will locate in spaces 19, 21, and 22, as shown in FIG. 3.

Figure 4:
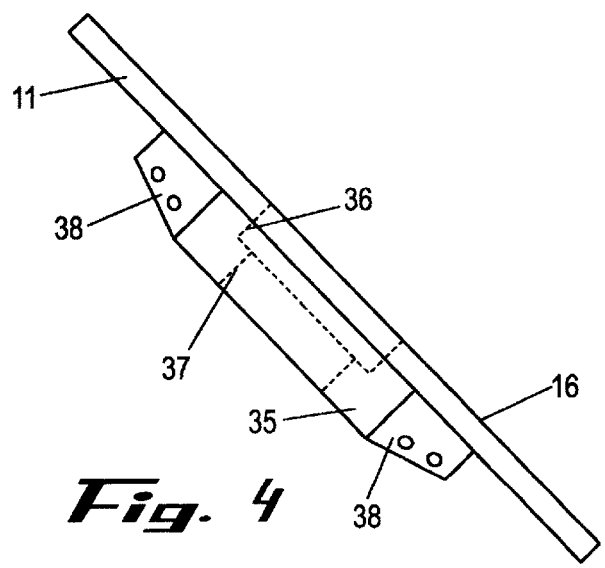
FIG. 4 is a side elevation view of the arrangement of FIG. 3.

In FIG. 3, bracket 10 (and other brackets as well) is shown with a hole 36 bored therethrough for holding, for example, a flower pot (not shown). A boss 35 extends below the bottom surface 17 and hole 36 has a reduced diameter portion 37 extending through boss 35 for additional support of the flower pot, as shown in FIG. 4. In addition, to add still more strength, a pair of ribs 38 extend radially outward from the boss 35 along bottom surface 17 and are, preferably, affixed thereto. Ribs 38 may also have holes 39 therein, as is also shown in FIG. 2, for hanging coat-hangers, for example.

FIG. 5 is a partially perspective, partially cross-sectional view of a portion of the utility bracket 10 mounted on walls 7 and 8 at the corner formed by the intersection 2. Each of the fingers 18 and 23 has its distal end formed in the shape of an inverted V, which depending legs 31 and 32 spaced from each other a distance substantially equal, although slightly greater than the width or thickness of the walls 7 and 8. Thus, once the walls 7 and 8 are in place, bracket 10, and other bracket also, may be mounted on the tops of the walls with the V-shaped fingers providing the necessary support.

FIG. 6 is a partial elevation view depicting how a clothes hook 41, for example, may be mounted on the inner leg 32 to extend into the cubicle, and FIG. 7 depicts a lip 42 formed on the perimeter of the surface 16 to prevent objects on that surface from slipping off. Lip 42 may be molded on the bracket 10 during the molding process, or it may be made of a suitable shape and size and affixed to top surface 16.

FIGS. 8 and 9 depict possible decorative shapes for the leg 11 of the bracket, a scalloped edge or a curved edge, respectively.

It is to be understood that the various features of the present invention might be incorporated into other types of decorative or utilitarian brackets and that other adaptations and modifications might occur to workers in the art. All such variations and modifications are intended to be included herein as being within the scope of the invention as set forth herein. Further, in the claims hereinafter, the corresponding structures, materials, acts and equivalents of all means or step plus function elements are intended to include any structure, material, or acts for performing the functions in combination with other elements as specifically claimed.

What is claimed is:

1. A utility bracket for mounting on the top edge of a panel, said bracket comprising:

a substantially planar member having top and bottom surfaces, a front leg, and first and second rear legs, each of said rear legs having first and second ends;

said first rear leg having a first array along at least a portion of its length of first support members having a first width and spaced from each other a first distance equal to said first width, each of said first support members extending downwardly from said bottom surface;

said first array being indented at each end of said first rear leg a second distance of at least one-half of said first distance;

said second rear leg having a second array along at least a portion of its length of second support members having said first width and spaced from each other said first distance, each of said second support members extending downwardly from said bottom surface, at least one of said second support members being spaced from an end of said second rear leg a distance equal to said first distance plus said second distance;

whereby said first and second spaced support members are adapted to interdigitate with the support members of a second, substantially identical bracket when mounted on the top edge of the panel when said first rear leg of said bracket is abutted to the second rear leg of said second bracket.

2. A utility bracket as claimed in claim 1, wherein the first and last of said first support members in said first array are each spaced from the ends of said first rear leg the second distance.

3. A utility bracket as claimed in claim 2 wherein said second distance is equal to approximately one half of said first width.

4. A utility bracket as claimed in claim 2, wherein said first rear leg and said second rear leg are of equal length.

5. A utility bracket as claimed in claim 3 wherein the first and last of said second support members in said second array are at the ends of said second rear leg and each has a width equal to said second distance.

6. A utility bracket as claimed in claim 1 wherein each of said first and second support members comprises a member having at least one support leg depending therefrom.

7. A utility bracket as claimed in claim 6 wherein each of said first and second support members has a second support leg depending therefrom and spaced from said one support leg.

8. A utility bracket as claimed in claim 7 wherein said one support leg and said second support leg form a U-shaped support.

9. A utility bracket for mounting on the top edge of a panel member comprising:

a substantially planar member having top and bottom surfaces and a substantially right triangular configuration with a front leg or hypotenuse and first and second rear legs of substantially equal length and each having first and second ends;

said first rear leg having a first array of first spaced U-shaped support brackets having a first width, each of said first support brackets extending downwardly from said bottom surface, and the spacing between said first support brackets being of a second width substantially equal to said first width;

said first array being indented at each end of said first rear leg by a third distance;

said second rear leg having a second array of second spaced U-shaped support brackets, said array extending from the first end to the second end of said second rear leg, each of said second support brackets extending downwardly from said bottom surface;

the second U-shaped brackets at each end of said second array having a width substantially equal to said third distance and the remaining second U-shaped brackets having a width equal to said first width and being spaced from each other by a distance equal to said second width.

10. A utility bracket as claimed in claim 9 and further comprising an elongated bracing member extended along said bottom surface and affixed thereto.

11. A utility bracket as claimed in claim 10 further comprising one or more holes in said bracing member.

12. A utility bracket as claimed in claim 9 and further comprising a hole bored through said planar member.

13. A utility bracket as claimed in claim 12 and further including a boss affixed to said bottom surface and depending therefrom.

14. A utility bracket as claimed in claim 13 wherein said hole bored in said planar member extends at least partially through said boss.

15. A utility bracket as claimed in claim 14 and further including strengthening ribs extending along and affixed to said bottom surface outwardly from said boss.

16. A utility bracket as claimed in claim 15 wherein at least one of said ribs has at least one hole bored therethrough.

17. A utility bracket as claimed in claim 9 wherein said front leg is curved.

18. A utility bracket as claimed in claim 9 wherein said front leg has a decorative edge.

19. A utility bracket as claimed in claim 18 wherein the edge of said front leg is scalloped.

* * * * *